US005157766A

United States Patent [19]

Butler et al.

[11] Patent Number: 5,157,766

[45] Date of Patent: Oct. 20, 1992

[54] BOUNDARY DRAWING AND AREA FILLING LOGIC FOR A DISPLAY SYSTEM

[75] Inventors: Nicholas D. Butler, Romsey; Adrian C. Gay, Fareham, both of England

[73] Assignee: International Business Machines Corporation, Armonk, N.Y.

[21] Appl. No.: 484,145

[22] Filed: Feb. 23, 1990

[30] Foreign Application Priority Data

Oct. 12, 1989 [EP] European Pat. Off. ........ 89310455.4

[51] Int. Cl.[5] .............................................. G06F 15/62

[52] U.S. Cl. ...................................................... 395/141

[58] Field of Search ................ 364/518, 521; 340/728, 340/730, 747; 382/21; 395/134, 141, 143, 133

[56] References Cited

U.S. PATENT DOCUMENTS

| | | | |
|---|---|---|---|
| 4,149,164 | 4/1979 | Reins et al. . | |
| 4,270,172 | 5/1981 | Tidd et al. | 340/730 X |
| 4,937,761 | 6/1990 | Hassett | 364/518 |
| 4,998,211 | 3/1991 | Hamada et al. | 364/518 |
| 5,007,098 | 4/1991 | Kumagai | 382/21 |

FOREIGN PATENT DOCUMENTS 0250868 5/1987 European Pat. Off. .

*Primary Examiner*—Gary V. Harkcom
*Assistant Examiner*—Mark K. Zimmerman
*Attorney, Agent, or Firm*—Martin J. McKinley

[57] ABSTRACT

A computer graphics system includes display logic (92) comprising a destination bit map (11) containing a plurality of image bits which map to a plurality of pixels for presenting an image, an auxiliary bit map (1) containing a plurality of area boundary bits representing pixels defining an area boundary line which encloses an area of the image, area filling logic (7) for operating upon those image bits enclosed by the area boundary line in order to fill the area with a particular pattern and color, characterized in that the display logic further comprises area boundary drawing logic (5) having line segmentation means to resolve the specified boundary line into a plurality of intersecting two pixel line segments which can, from that time forward, be operated upon separately to define the area boundary bits in accordance with conventional area boundary drawing rules.

2 Claims, 4 Drawing Sheets

| OCTANT CODE C2 | C1 | C0 | LINE | DRAW PEL1 | DRAW PEL2 | RESULT |
|---|---|---|---|---|---|---|
| 0 | 0 | 0 | 1 2 | NO | NO | • • |
| 0 | 0 | 1 | 2<br>1 | NO | YES | *<br>• |
| 0 | 1 | 0 | 2<br>1 | NO | YES | *<br>• |
| 0 | 1 | 1 | 2<br>1 | NO | YES | *<br>• |
| 1 | 0 | 0 | 2 1 | NO | NO | • • |
| 1 | 0 | 1 | 1<br>2 | YES | NO | *<br>• |
| 1 | 1 | 0 | 1<br>2 | YES | NO | *<br>• |
| 1 | 1 | 1 | 1<br>2 | YES | NO | *<br>• |

BOUNDARY DRAWING AND AREA FILLING LOGIC FOR A DISPLAY SYSTEM

TECHNICAL FIELD

The present invention relates to a display system including apparatus for defining a boundary which encloses a filled image area stored in a display memory. The filled image area can be part of an image presented by means which are dependent on the nature of the display system. Common image output devices are printers and displays.

BACKGROUND ART

For the purpose of explanation, and to highlight a particular application of the invention, a computer system including a display device for which the image is resolved into a two dimensional array of picture elements (pixels) will be described. Each pixel can therefore be represented by a bit stored in a bit map arranged within a memory which is part of the display system. A display system can be a computer system itself, or an optional, peripheral adapter, such as a display adapter card installed in a computer system.

For simplicity of explanation, a process by which bits are either set or not set in order to define a boundary or area in a display memory is referred to as a drawing process.

A display system is commonly utilised to fill areas of a displayed image, such as slices of a pie chart for instance, with a particular color or shading pattern. This is commonly achieved by means of a boundary defined area fill process.

In order to correctly fill an area, area boundary segments should be drawn according to a set of general rules which can be summarized as follows:

a) A new area boundary pixel status is determined according to an Exclusive-OR function by which a new boundary pixel is combined with a current boundary pixel.

b) If an area boundary segment has a positive gradient, the second pixel in the segment is not set. Similarly, if an area boundary segment has a negative gradient, the first pixel in the segment is not set.

c) If an area boundary segment has a shallow gradient, and is therefore composed of horizontal runs of adjacent pixels, the first pixel of the segment only is set if the gradient is positive and the last pixel of the segment only is set if the gradient is negative.

d) If an area boundary segment is horizontal, the pixels composing the segment are not set. An area boundary segment specified by a single pixel is rejected in a similar fashion.

Failure to adhere to such rules causes an area filling procedure to start or stop unpredictably or in incorrect locations within the destination bit map.

EP-A-0145821 describes an area boundary drawing procedure implemented by a combination of hardware and software, and the area fill procedure is implemented by hardware. More specifically, it describes an area filling procedure for a graphics displaying computer system in which, in order to draw filled areas, additional control logic is supplied to define an outline of the area in an auxiliary memory using Bresenham's Algorithm. Area filling logic consisting of Exclusive-OR gates is used to fill the enclosed area in the refresh buffer as the enclosing outline is read from the auxiliary memory. A combination of hardware and software is used to examine each line segment and either reject it according to conventional rules or define it with the appropriate Y direction, swapping end points if necessary.

Such a process is suitable for drawing an area boundary specified by a succession of single line segments. However, problems arise when the area boundary includes complex curves. In such cases, it is not necessarily possible to simply swap end points to ensure a consistent drawing direction, since a general curve may have some sections moving up the image while other sections are moving down.

SUMMARY OF THE INVENTION

The aim of the present invention, therefore, is to enable boundary lines to be drawn in any direction, in accordance with the aforementioned general boundary drawing rules.

According to the present invention there is now proposed, a computer graphics system having display logic comprising a destination bit map containing a plurality of image bits which map to a plurality of pixels for presenting an image, an auxiliary bit map containing a plurality of area boundary bits representing pixels defining an area boundary line which encloses an area of the image, area filling logic for operating upon those image bits enclosed by the area boundary line in order to fill the area with a particular pattern and color, characterized in that the display logic further comprises area boundary drawing logic having line segmentation means to resolve the specified boundary line into a plurality of intersecting two pixel line segments which can, from that time forward, be operated upon separately to define the area boundary bits in accordance with conventional area boundary drawing rules.

In accordance with the present invention, therefore, an area boundary line, for drawing in an auxiliary bit map can be constructed from intersecting two pixel line segments. An analogy can be drawn between a two pixel line segment of the line and a link in a bicycle chain. The link is connected to an adjacent link by a rivet which is common to both links. A pixel in the construction of the line can therefore be likened to a rivet in the bicycle chain.

Preferably, the area boundary drawing logic includes pixel resolving logic for resolving a two pixel line segment into a first pixel and a second pixel which can, from that time forward, be operated upon separately in order to define the area boundary bits in accordance with conventional area fill boundary drawing rules.

This arrangement has the advantage that, at any one time, the area fill boundary drawing logic is processing a two pixel line segment rather than a line segment composed of a larger number of pixels. Logical operations associated with boundary line drawing are thus simplified. It follows, therefore, that the area fill boundary drawing logic circuitry can be less complicated in construction. This, in turn, reduces the time taken for the computer graphics system to process area fill boundary line data. Furthermore, such a technique can be applied to general incremental line drawing algorithms for image generation, such as Bresenham's run length algorithm, wherein horizontal runs of pixels are produced rather than single pixel steps.

In one particularly preferred arrangement, the area boundary drawing logic has direction determining logic for determining a direction of extension of the specified boundary as introduced by a two pixel line segment and for operating upon the first pixel and the second pixel accordingly. This has the advantage that the area boundary can be drawn in the auxiliary bit map in any direction, without modifying the area boundary line, by swapping end points for instance.

BRIEF DESCRIPTION OF THE DRAWING

In the following, an example of a logic circuit in accordance with the present invention will be described with the aid of the following diagrams in which.

DESCRIPTION OF THE PREFERRED EMBODIMENTS

Figure 1:
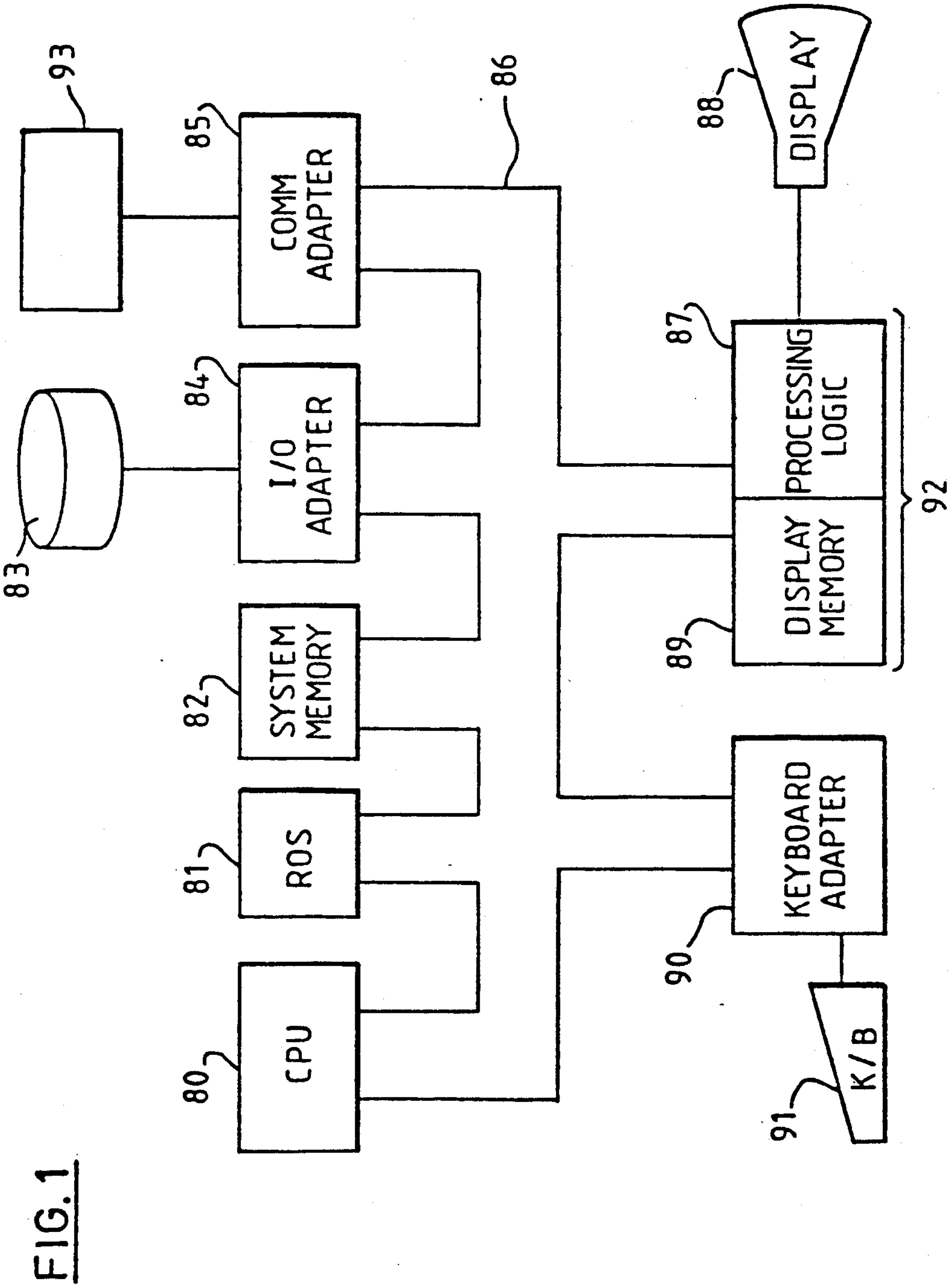
FIG. 1 is a block diagram of a computer system including a display system.

FIG. 1 illustrates an example of a computer system for graphics data processing. The computer system includes a central processing unit (CPU) (80) for executing programmed instructions involving the data. A bus architecture (86) provides a data communication path between the CPU and other components of the computer system. A read only memory (ROS) (81) provides secure storage of data. A random access system memory (82) provides temporary data storage. Data communication with a host computer system (93) is provided by a communication (COMM) adapter (85). An I/O adapter (84) enables data to pass between the bus architecture and a peripheral device such as a disc file (83). A user can operate the computer system using a keyboard (91) which is connected to the bus architecture via a keyboard adapter (90). A display device (88) provides a visual output from the computer system. The visual output is generated by a display system (92) which can be split into a display memory (89) and processing logic (87).

The processing logic contains boundary defined area filling hardware for operating upon image data stored in the display memory. Some functions of the boundary defined area filling hardware will now be described with reference to the block diagram shown in FIG. 2.

Figure 2:
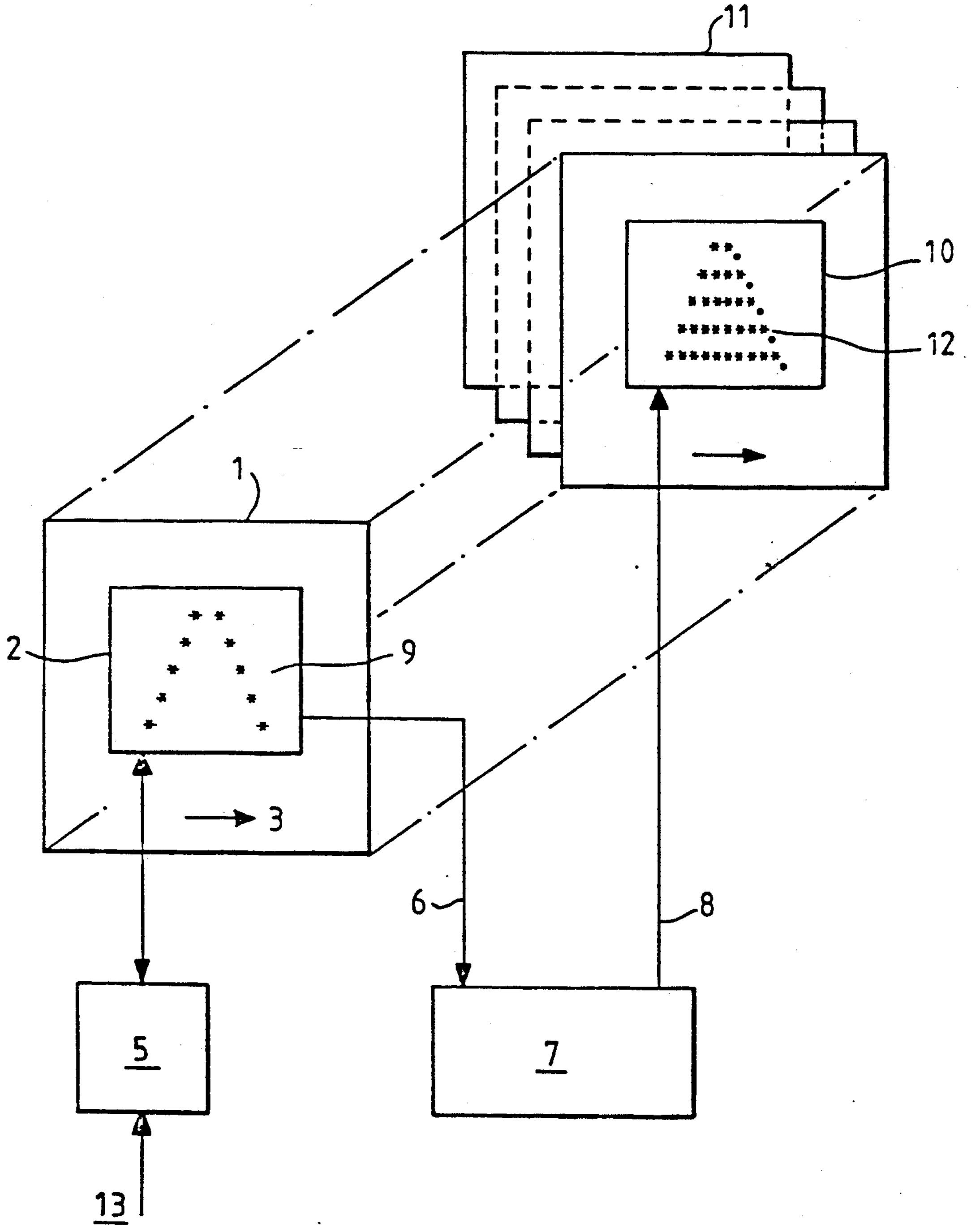
FIG. 2 is a block diagram of boundary defined area filling hardware for the display system.

Initially, an area boundary (9) is drawn in an auxiliary bit map (1) which is part of a display memory. This task is performed by boundary drawing logic (5) in response to graphics data supplied to the display system via the bus architecture. The display memory also contains a separate, destination bit map (11) for storing bit patterns representative of pixel components of a displayed image. A one for one mapping can be defined between the auxiliary bit map and the destination bit map. A rectangular section (2) of the auxiliary bit map encloses the area boundary. This rectangular section is sequentially scanned (6), bit row by bit row, from left to right, by area scanning and filling logic (7). The area scanning and filling logic simultaneously scans (8) a rectangular section (10) of the destination bit map corresponding to that in the auxiliary bit map. The left hand edge of the rectangular section is on the outside of the area boundary. Accordingly, the area scanning and filling logic therefore ignores this region of the destination bit map. However, when the area boundary is crossed, the area scanning and filling logic begins an area filling procedure for drawing a filled area (12) in the destination bit map. When the area boundary is next crossed, the area filling procedure stops. This process repeats until the right hand edge of the rectangle is reached. Each bit row in the scan rectangle is scanned in a similar manner. In order to prevent adjacent filled areas from overlapping, the boundary defined area filling process operates on the destination bit map so that a boundary is included in any left hand edge of a filled area but excluded from any right hand edge. For the purpose of illustration, a drawn pixel is indicated in FIG. 2 by "*", while a null pixel is indicated by ".".

Figure 3:
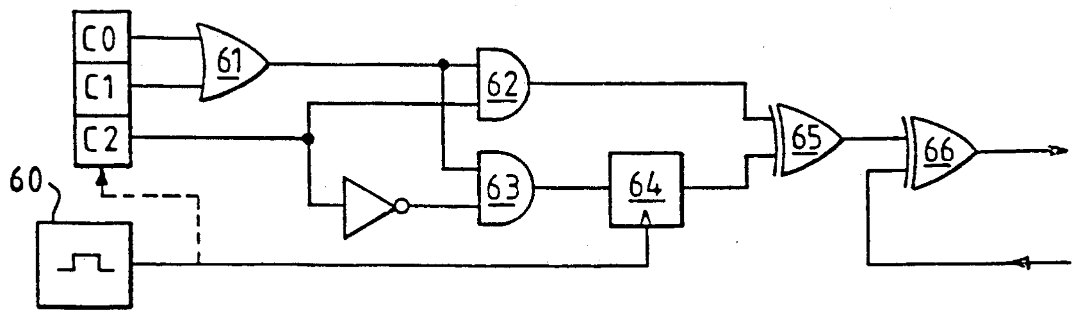
FIG. 3 is a block diagram of area boundary drawing logic for defining a two pixel line segment.

An example of area boundary drawing logic according to the present invention will now be described with reference to the logic circuit shown in FIG. 3.

This logic circuit is responsive to a 3 bit octant code (C0, C1, C2) representation of the two pixel line segment. The octant code is refreshed in response to a clock generator signal (60). The first pixel of a two pixel line segment is potentially drawn if OR gate 61 has a high output and C2 is high. This causes AND gate 62 to have a high output. The second pixel of a two pixel line segment is potentially drawn if OR gate 61 has a high output and C2 is low. This causes AND gate 63 to have a high output. The output of AND gate 63 is stored by register 64. The register passes its contents to Exclusive-OR gate 65 in response to the clock generator signal which loads the next octant code. The next octant code corresponds to the next two pixel line segment to be processed. Exclusive-OR gate 65 combines the output of AND gate 62, representing the first pixel, with the output of register 64, representing the second pixel, to produce a desired pixel bit. The desired pixel bit is compared with an existing pixel status bit stored in the auxiliary bit map by an Exclusive-OR gate 66. The output of Exclusive-OR gate 66 replaces the existing pixel status bit with a new status bit.

It will be appreciated that, according to the present invention, an area boundary line, for drawing in an auxiliary bit map, can be constructed from intersecting two pixel line segments. An analogy can be drawn between a two pixel line segment of the line and a link in a bicycle chain. The link is connected to an adjacent link by a rivet, which is common to both links. A pixel in the construction of the line can, therefore, be likened to a rivet in the bicycle chain.

Figures 4, 5:
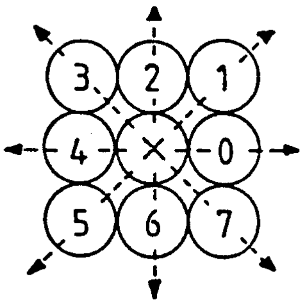
FIG. 4 illustrates eight orientations of a two pixel line segment.
FIG. 5 is a table relating eight orientations of a two pixel line segment to a bit for pixel representation.

There are eight possible orientations of a two pixel line segment. In FIG. 4, these orientations or "octants" are labelled 0 to 7. It follows, therefore, that an orientation can be represented, for the purpose of logic processing, by a three bit octant code. However, it will be appreciated that, dependent on the boundary drawing logic provided, such an octant code may be specified by more bits. In a table shown in FIG. 5, each orientation of a two pixel line segment corresponds to a specific three bit octant code. The table also shows which pixels of the two pixel line segment are to be drawn to comply with the aforementioned general line drawing rules. In this sense, the table can be considered as a truth table on which area boundary drawing logic can be based in accordance with the present invention.

Two example line types for processing in accordance with the present invention will now be described.

Figure 6:
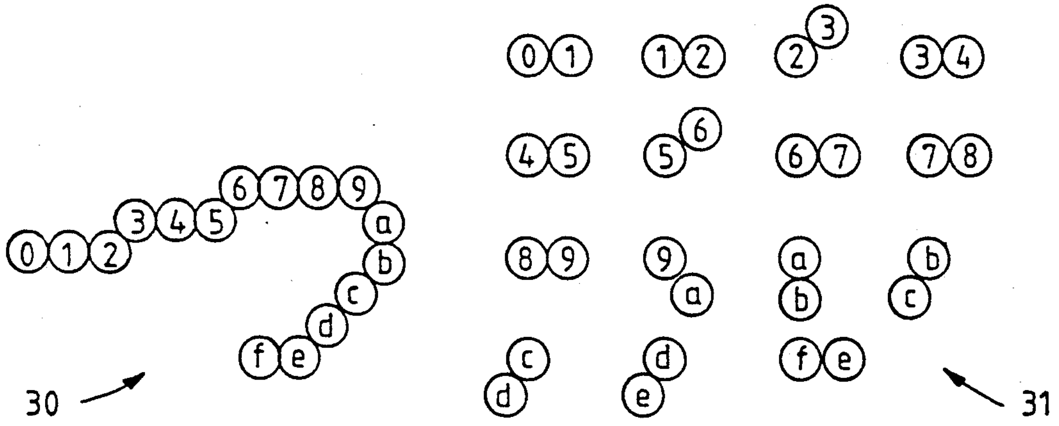
FIG. 6 shows a typical section of an area boundary line, for drawing in an auxiliary bit map, subdivided into a set of two pixel line segments.

FIG. 6 illustrates a line (30) which is constructed from fifteen intersecting two pixel line segments (31). For the purpose of illustration, successive pixels in the line are assigned to ascending hexadecimal numbers thereby highlighting interconnections between two line segments.

Figure 7:
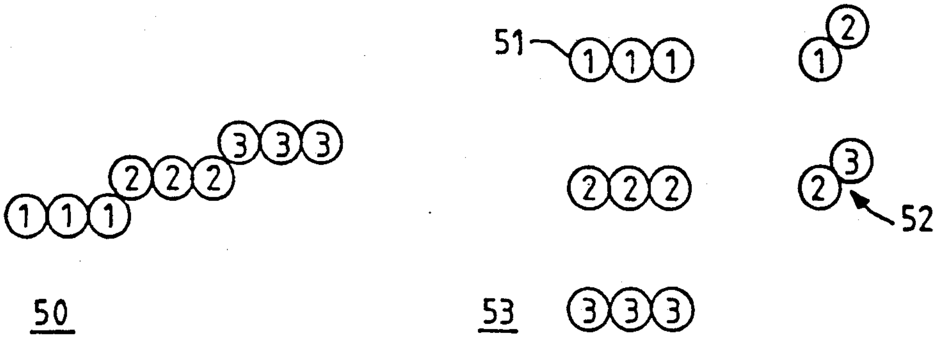
FIG. 7 shows a typical line defined according to a run length algorithm for drawing in a bit map, subdivided into a set of two pixel line segments and horizontal pixel runs.

FIG. 7 illustrates a boundary line drawn by a line drawing algorithm, such as Bresenham's Run Length Algorithm. Each iteration of the algorithm produces a horizontal run of pixels (51) rather than a single pixel. A step (52) between one horizontal run of pixels and the next is represented by a two pixel line segment. In this example there are three horizontal line segments. For illustration purposes, these are labelled 111, 222, and 333. According to the aforementioned general rules, each horizontal run of pixels is classed as a horizontal line segment and is therefore rejected by the area boundary drawing logic. The length of the horizontal line segment simply identifies the location at which the next pixel is drawn.

We claim:

1. A computer graphics system having display logic comprising:

a destination bit map containing a plurality of image bits which map to a plurality of pixels for presenting an image;

an auxiliary bit map containing a plurality of area boundary bits representing pixels defining an area boundary line which encloses an area of said image;

area filling logic for operating upon image bits of said destination bit map that are enclosed by said area boundary line, as represented by said area boundary bits of said auxiliary bit map, in order to fill said area with a particular pattern and color; and area boundary drawing logic having:

line segmentation means to resolve a specified boundary line into a plurality of two pixel line segments which line segments can be operated upon separately to define said area boundary bits;

direction determining logic for determining a direction of extension and for producing a corresponding direction code comprising a plurality of bits for each pixel in each of said two pixel line segments;

means for combining a current boundary pixel stored in said auxiliary bit map with a new boundary pixel, as represented by a direction code corresponding to said new boundary pixel and received from said direction determining logic, via an Exclusive-OR function in order to update said current boundary pixel to a new pixel status, said current boundary pixel coinciding with said new boundary pixel at an intersection of two, two pixel line segments.

2. A display system as claimed in claim 1 wherein said specified boundary line is a line defined by an incremental line drawing algorithm.

* * * * *